April 21, 1964　　R. M. GAGE ETAL　　3,130,292
ARC TORCH APPARATUS FOR USE IN METAL MELTING FURNACES
Filed Dec. 27, 1960　　2 Sheets-Sheet 1

INVENTORS
ROBERT M. GAGE
GEORGE M. SKINNER
WILLIAM F. CUDDIHY
DONALD W. SUNDSTROM
BY William F. Mesinger
ATTORNEY

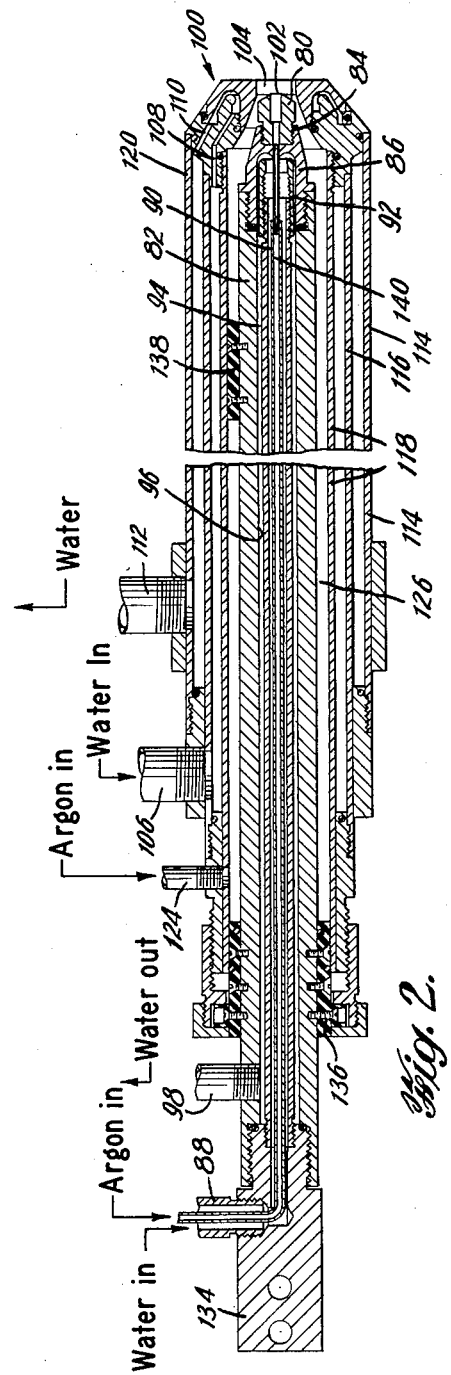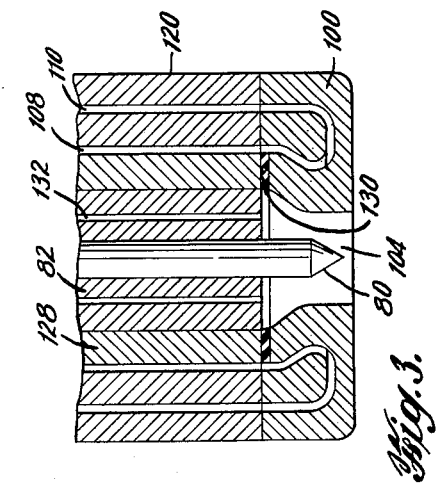
INVENTORS
ROBERT M. GAGE
GEORGE M. SKINNER
WILLIAM F. CUDDIHY
DONALD W. SUNDSTROM
BY *William F. Mesinger*
ATTORNEY

United States Patent Office 3,130,292
Patented Apr. 21, 1964

3,130,292
ARC TORCH APPARATUS FOR USE IN METAL MELTING FURNACES
Robert M. Gage, Summit, N.J., George M. Skinner, Indianapolis, Ind., William F. Cuddihy, Poquoson, Va., and Donald W. Sundstrom, Indianapolis, Ind., assignors to Union Carbide Corporation, a corporation of New York
Filed Dec. 27, 1960, Ser. No. 78,671
6 Claims. (Cl. 219—75)

The present invention relates to an improved arc torch, especially adapted for use in a metal melting arc furnace.

An electric arc is well-known as a source of concentrated thermal energy for metal melting and refining. Prior apparatus for using an arc in this area falls into two categories. The first type maintains an arc between two electrodes and then relies upon radiation from the arc or upon a gas stream which has passed through the arc to transfer the arc heat to the melt. This type of heating is generally unsatisfactory and has been commercially used only in relatively small furnaces where a high degree of the radiation can be transferred to the melt. A second type of apparatus maintains an arc between electrodes wherein the melt becomes part of the circuit. In this way an increased amount of heat can be transferred to the melt both by resistance heating and by direct arc heating.

Carbon electrodes are generally used in transferred arc furnaces since they are readily available and can carry the high currents generally required. Previously used carbon electrodes have several disadvantages. First, there is appreciable electrode loss caused by arc erosion and electrode vaporization. Second, such carbon electrode loss usually adds an undesirable amount of carbon to the melt. This is especially harmful when metals such as titanium are melted. Third, the current-carrying capacity of carbon is such that fairly massive electrodes are required to carry currents of 5,000–10,000 amperes.

Attempts have been made in the arc furnace prior art to replace carbon electrodes with other materials such as tungsten. These attempts have generally been unsuccessful. The tungsten electrode has become contaminated with the melt material through splashing or by contact with the metal vapor-laden furnace atmosphere. Such contamination causes severe electrode erosion and concurrent arc instability. In view of such prior work, it has long been believed by those skilled in the art that non-consumable electrode operation would not be successful in arc furnaces and, even if accomplished on a laboratory basis, would be commercially inefficient.

However, it has now been found that a modified transferred arc torch apparatus accomplishes surprising results when operated as a non-consumable electrode in a metal melting arc furnace.

It is accordingly an object of the present invention to provide an arc torch for arc furnace heating which provides an extremely stable arc and substantially no electrode erosion even under the most severe furnace conditions.

It is a further object to provide such an apparatus which will be able to withstand the high temperatures and splash encountered during such furnace operation.

Other objects and advantages will be apparent from the following description and drawings in which:

FIG. 2 is a view in cross-section of a preferred embodiment of a non-consumable electrode device according to the invention; and FIG. 3 is a partial view in cross-section of still another embodiment of the invention.

Figure 1:
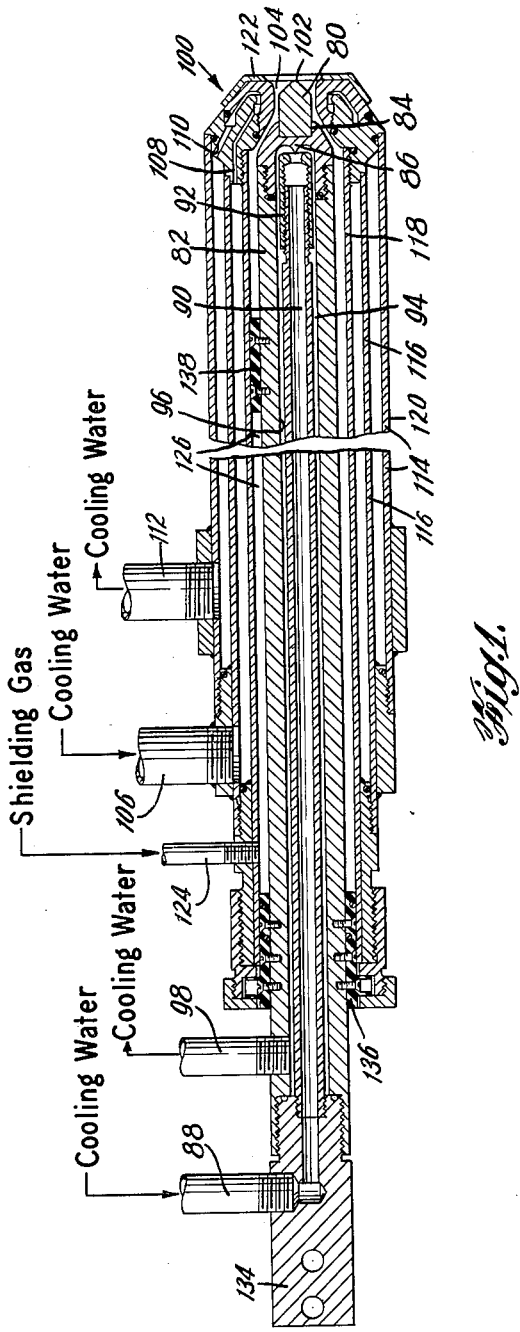
FIG. 1 is a view in cross-section of one embodiment of a non-consumable electrode device according to the present invention.

The objects of the invention are accomplished in general by a non-consumable electrode device adapted for producing and maintaining a directionally stabilized arc-gas effluent between itself and a furnace charge which comprises an elongated inner electrode holder having coolant passages therein and an outer member having coolant passages therein radially spaced from the electrode holder and preferably forming an annular shielding gas passageway therebetween. A refractory metal electrode insert is affixed to one end of the electrode holder in electrical and thermal contact therewith while a nozzle member is attached to the adjacent end of the outer member which surrounds the electrode insert and the lower end of the electrode holder and forms an annular orifice therebetween preferably of a smaller diameter than the annular shielding gas passageway. Alternatively, shielding gas passages may extend through the electrode holder in a longitudinal direction. Such passages are preferably positioned in a concentric relation to the longitudinal axis of the electrode holder so as to form a uniform gas shield around the metal electrode. The diameter of the orifice in the nozzle member is preferably smaller than the concentric diameter of the shielding gas passages in the electrode holder. Means are additionally provided at the opposite end of the device for supplying coolant to the inner and outer members, arc power to the electrode holder and shielding gas to the annular passageway or longitudinal shielding gas passages.

The improved apparatus of the instant invention enables refractory metal electrodes to be used in metal melting and refining furnaces with substantially no electrode loss (less than 1–2 grams/hr. for a ¾-in. dia. tungsten electrode) even at current levels above about 4,000 amperes and with stability of arc operation unavailable with any existing arc furnace apparatus. This apparatus generally consists of a ⅛ to 2 in. dia. refractory metal electrode, usually the cathode for direct current operation, supported by a water-cooled electrode holder and positioned within the central passage of a ⁹⁄₁₆ to 3-in. dia. water-cooled nozzle used to shield the cathode from contamination from the melt and the furnace atmosphere. The tip of the cathode is either approximately even with the nozzle outlet or is recessed a slight amount. Means are also provided for passing a shielding gas stream of between about 5 c.f.h. to about 100 c.f.h., or more if desired, around the cathode and out through the nozzle passage to supply additional shielding protection to the cathode.

A concept of the present invention may be gained by considering the torch assembly with internal electrode, nozzle, and hot gas effluent as a virtual current conducting electrode, possessing the advantages of carbon electrodes without many of the disadvantages. In this analogy the nozzle assembly and inner electrode holder can be compared to the clamping arrangement of a carbon electrode, introducing current to the conducting medium and establishing its direction. The conducting gas effluent (quasi-electrode) possesses a stiffness and directivity comparable in utility to that of the carbon electrode, though infinitely less brittle, and not subject to breakage. The resistivity of the arc gas effluent is of the same order as the carbon electrode but obviously has a higher current-carrying capacity since it cannot be overloaded.

The invention will now be described in more detail with respect to the drawings in which FIG. 1 represents a modification of the invention useful at power levels of about 500–2,000 kw. in 1 to 10-ton furnaces. Cathode 80, preferably constructed from refractory metals such as tungsten, tantalum, columbium and molybdenum containing minor amounts of emissive materials such as thoria and yttria, is supported by electrode holder 82 through press-fit, soldered, or threaded joint 84. In order to remove excess heat from cathode 80 and prevent it from melting, electrode holder 82, fabricated from high thermal conductivity material such as copper, is cooled by high velocity fluid coolant. It is preferred that electrode 80 not be in direct contact with the cooling fluid, but that they be separated by the portion 86 of the electrode holder 82. In this manner, no cooling fluid can leak into the arc area in the event of an imperfect joint 84. Cooling fluid enters through inlet 88 and through the central passage 90 in cooling tube 92 and leaves through annular passage 94 between cooling tube 92 and

[text obscured]

is protected from metal splash and furnace atmospheric gas contamination primarily by nozzle 100 which is positioned around and adjacent to the arcing tip 102 of cathode 80. When ½ to 1 in. dia. cathodes are used, central passage 104 of nozzle 100 should be about ½ to 1½ in. dia. As the cathode size increases up to about 2 in. dia., passage 104 will increase up to about 3 in. dia.

Nozzle 100 is water-cooled by flowing water at high velocity (greater than 100 ft./sec.) from inlet 106 into annular passage 108 and out through annular passage 110 and outlet 112. As an example of successful operation at about 3,000–10,000 amperes, water at 40 g.p.m. and 200 p.s.i.g. is supplied to the annular nozzle cooling passages which are about 1/64-in. wide. This particular cooling arrangement, which is used in conjunction with concentric tube 114, 116, and 118 of torch body 120, provides adequate cooling of the nozzle and torch body to prevent melting or other damage caused by arc heat or furnace metal contamination. In large metal furnaces wherein high currents and voltages are used, there is increased danger of double arcing through the nozzle to the metal bath, especially when the arc length is less than about 4 inches (with 200 volts operation). It is therefore preferred that the nozzle have a refractory insulating liner 122 along the lower portion to protect against such double-arcing and attendant nozzle damage. It is desirable that arcing tip 102 of cathode 80 be positioned about ⅛ to ¼ in. inside passage 104 to increase arc stability and reduce cathode erosion. If the set-back is about ½ in. or more, there is a tendency for the arc to jump to the nozzle and then to the metal bath. Such double-arcing will destroy the nozzle. If the cathode extends an appreciable distance beyond the nozzle, an uneconomically excessive amount of shielding gas is required to protect the cathode.

In order to further protect the cathode 80 from the contamination, a gas stream flows from inlet 124 through amperes, it may be desirable to increase the shielding gas flow. In some high current metal melting operations, it may be desirable to use as much as 1000 c.f.h. of shielding gas to properly protect the cathode. Inert gases, such as argon and helium, are preferred, but other gases such as diatomic hydrogen and nitrogen can also be used to provide extra heat especially during meltdown. The gas flow must be such as to provide a minimum velocity of about 5–10 ft./sec. along the cathode in order to counteract the circulation of furnace gases into the electrode area caused by arc pumping.

When using arc currents of about 500–4000 amperes, [text obscured] grams per hour for a ¾-in. dia. electrode at high current levels.

Another species of the present invention which is primarily useful in the 20–100 kw. power range for furnaces of about 100 lbs. or less capacity is shown in FIG. 3. In this form cathode 80 is about ⅛ to ¼ in. dia. and nozzle passage 104 is about 3/16 to ½ in. dia. Due to the decreased equipment size, the water-cooling supplied to torch body 120 and nozzle 100 through annular cooling passages 108 and 110 can be also used to cool electrode holder 82 and cathode 80. Electrode holder 82 is thus positioned in thermal and electrical contact with electrode holder sleeve 128 that is directly cooled by the fluid in passage 108. Nozzle 100 and torch body 120 are electrically insulated from electrode holder sleeve 128 through insulator 130. Shielding torch gas flows through longitudinal passages 132 in electrode holder 82 and out through passage 104 in nozzle 100. This gas stream is in the order of 15–50 c.f.h. for operation in the 20–100 kw. range.

In the form shown in FIG. 1 electrical power is supplied directly to the electrode holder through connection 134 while the torch body is insulated from electrode holder 82 by insulator 136 and insulated spacer 138. The main arc from cathode 80 to the melt can be initiated in several ways. Cathode 80 could be extended through nozzle 100 until it contacts the melt electrode and then withdrawn to form the arc. A preferred method is to maintain a pilot arc of relatively low power between cathode 80 and nozzle 100. Such pilot arc thus provides sufficient ionized gas to initiate the main arc.

In the form shown in FIG. 3, electrical power is supplied either directly to electrode holder 82 or more conveniently through electrode holder sleeve 128 and then to electrode holder 82. The arc can be started by methods similar to those of FIGS. 1 and 2, the outer portion of torch body 120 is preferably electrically insulated so as to minimize double-arcing problems.

The following examples clearly illustrate the utility of the present invention and especially show utilty for metal melting operations.

*Example I*

Cathode apparatus of the type shown in FIG. 1 was used. A ¾-in. dia. tungsten electrode containing 1% the cathode and a rotating water-cooled graphite anode. The 19-minute test resulted in a cathode weight loss of only 0.4 gram.

*Example II*

Cathode apparatus of the type shown in FIG. 2 was used. A 1-in. dia. thoriated tungsten cathode having a ⅜-in. dia. central gas passage was positioned within a 1¼-in. dia. water-cooled copper nozzle. The tip of the cathode was recessed ¼-in. from the nozzle outlet. Argon gas at 500 c.f.h. passed around the cathode and out through the nozzle while 120 c.f.h. argon passed through the cathode central passage. A pilot arc of 180 amperes was initiated by high frequency starting means between the cathode and the nozzle. This pilot arc provided the starting means for a 60 volt, 2,000 ampere arc 2½-in. long between the cathode and a cast iron cylindrical billet 22-in. in dia. and 18-in. high surrounded by water-cooled copper coils. The arc length was increased to 5-in. and the electrical input increased to 4,000 amperes and 115 volts. At the end of 6 min., the arc had melted a 10-in. dia. portion in the top of the metal anode. While considerable molten metal had been splashed up on the torch body, there was substantially no damage to the cathode.

*Example III*

A cathode apparatus similar to that shown in FIG. 1 consisted of a ½-in. dia. thoriated tungsten electrode positioned within a ¾-in. dia. water-cooled copper nozzle. The tip of the cathode was recessed ⅛-in. from the nozzle outlet. Argon gas at 180 to 190 c.f.h. passed around the cathode and out through the nozzle. A pilot arc of 175 amperes and 18 volts was continuously maintained between the cathode and the nozzle. This cathode structure was mounted in a cover for a metal melting crucible and extended into the crucible the contents of which constitued the anode. The crucible was 5 ft. in dia. and about 5 ft. deep with a 1-ft. thick refractory lining. It contained 1,000 lb. scrap steel, 70 lb. pig iron and 50 lb. ingot iron for a 1,120 lb. total charge. Electrical connection to the crucible was maintained through three 2-in. dia. ingot iron rods which formed bottom electrodes. An arc of 990 amperes and 160 volts was initiated between the cathode and the metal charge. About 45 min. later, the arc power was increased to 2,000 amperes and 177 volts. Ten minutes later the power was increased to 2460–2500 amperes and 165 volts. After about 2 hours, the metal charge was totally molten. The run was continued for about an hour, during which time the arc was periodically extinguished to take temperature readings of the bath and then reignited. At the end of this time the arc was extinguished and the molten charge was poured from the furnace. Examination of the cathode and nozzle indicated negligible damage or erosion.

*Example IV*

The cathode apparatus similar to that of FIG. 3 consisted of a ¼-in. dia. tungsten electrode containing 2% thoria mounted flush with the outlet of a ⁵⁄₁₆-in. I.D. water-cooled copper nozzle. This apparatus was mounted within a 12-in. I.D. furnace 8-in. deep having a 2½-in. thick refractory lining on the walls and a 4-in. thick lining on the bottom. The furnace contained about 50 lb. of Armco ingot iron punchings. Argon gas at 34 c.f.h. was passed around the cathode and through the nozzle. An arc of about 25 to 50 volts and 500 amperes was initiated by touching the cathode to the punchings and then withdrawing it to a distance of about ½-inch. As the metal melted, the arc length gradually increased to about 2½-in. After 8 min., 31 c.f.h. hydrogen was added to the argon stream which resulted in a voltage of 80 to 110 volts. Temperature measurements taken with an immersion thermocouple indicated that the charge was completely melted after about 30 minutes. The arc was then maintained for about 15 minutes, at which time the melt was poured. The arc was intentionally extinguished just prior to pouring. The total power required for melting was competitive with that of existing processes used with 50-lb. furnaces.

*Example V*

Cathode apparatus of the type shown in FIG. 2 was used. A 1-in. dia. thoriated tungsten cathode having a ⅜-in. dia. central gas passage was positioned in a 1½-in. dia. water-cooled copper nozzle. The tip of the cathode was recessed ¼-in. from the nozzle outlet. An arc of 9000 amperes and 115 volts was maintained between the hollow thoriated tungsten cathode and a rotating water-cooled graphite anode while 100 c.f.h. argon flowed through the hollow cathode and 300 c.f.h. argon passed around the cathode. The run was continued for 20 minutes with a tungsten loss of only 0.079 gram (0.24 gram/hr.). A small pit at the periphery of the cathode passage was the only visible damage to the cathode surface. Operation at similar current conditions could not be maintained with prior solid tungsten electrodes without complete electrode destruction.

The prior examples all used the cathode in a substantially vertical position with respect to the anode. It may be desirable in many instances to position the cathode at an angle to the metal bath. This has the advantages of reducing metal splash on the torch and also provides some stirring action for the bath. Metal splash on the torch could also be minimized by moving the torch over the surface of the bath.

The above examples illustrate the ability of the device to melt a metal charge in a furnace. In all of these tests there was virtually no evidence of electrode loss and thus no melt contamination. There was likewise, substantially no damage to the torch body itself due to metal splash, spatter and the like. It may thus be seen that the instant device will perform satisfactorily for indefinite periods in a metal melting furnace and is thus far superior to the conventional carbon arc and presently available arc torches.

While certain preferred embodiments have been disclosed and described, it is to be understood that certain modifications and substitutions could be made by a person skilled in the art without departing from the spirit and scope of the invention. For example, the above discussion has been directed mainly at a high power (500–2,000 kw.) torch useful in 1 to 10-ton furnaces and at a small power (20–100 kw.) torch useful in 100 lb. furnaces or smaller. It should be understood that the principles of the present invention include the intermediate power range and furnace size as well. In addition to the D.C. straight polarity power described, this apparatus also has some utility with D.C. reverse polarity and A.C. power.

What is claimed is:

1. A non-consumable transferred arc torch device producing a directionally stabilized quasi-electrode for heating a metal melting furnace which comprises five concentric tubes defining therebetween a central passage and first, second, third and fourth annular passages respectively, nozzle means having a relatively wide inlet portion and a constricted outlet connected to and providing an end closure for the outer three tubes at one end thereof and further providing for communication between the third and fourth annular passages, electrode mounting means connected to the same end of the two inner tubes providing an end closure therefor and further providing for communications between said central passage and said first annular passage, means at the other ends of said tubes providing coolant inlet and outlet flow paths for the central and first annular passages and the third and fourth annular passages respectively, and a shielding gas inlet to the second annular passage, a refractory metal electrode insert axially mounted on the electrode mounting means, said electrode insert and electrode mounting means forming together with said nozzle means an annular convergent flow path for said shielding gas and an exit orifice surrounding said electrode insert of smaller diameter than said second annular passage whereby the shielding gas will be forced into substantial intimate contact with the transferred arc between the electrode and a metal bath within the furnace, said electrode insert extending into but not beyond said constricted outlet, and means for providing arc current to the electrode insert.

2. A non-consumable transferred arc torch device for heating a metal melting furnace as set forth in claim 1 wherein all five concentric tubes, the electrode mounting means and the nozzle means are constructed of a material having high thermal conductivity and wherein those portions of the nozzle means closest to the metal bath are provided with a refractory coating thereon.

3. An arc-torch device as set forth in claim 2 for extremely high current levels wherein a thin walled member passes axially through the inner tube and is connected in gas-tight relationship at one end to an axial passageway through the electrode holding means and the electrode insert and to a shielding gas source at the other end, whereby a stream of shielding gas may be introduced directly into the center of the electrode to substantially reduce electrode erosion.

4. A non-consumable transferred arc torch for producing a directionally stable quasi-electrode for heating a metal melting furnace which comprises an outer body member, one end of which is adapted to be inserted into a metal melting furnace adjacent the surface thereof and said body member comprising three concentric tubes defining inner and outer annular coolant passages therein; nozzle means at said one end of the body member providing a closure for and communication between the twin annular coolant passages and defining an orifice in the one end of the body member of lesser diameter than the inside diameter of the body member; an electrode holder axially located within, radially spaced and electrically insulated from said body member forming an annular shielding gas passage therebetween, composed of two concentric tubes forming central and annular coolant passages therein and having an electrode mounting means at the end thereof adjacent to nozzle means providing a closure for an communication between the coolant passages, a refractory metal electrode insert mounted axially on the electrode mounting means, and extending into but not beyond said nozzle means, the exterior surfaces of the electrode mounting means and the electrode insert in combination with the inner surface of the nozzle means forming a convergent shielding gas flow path whereby the shielding gas is forced into intimate contact with an arc between the electrode and a charge within the furnace.

5. A furnace heating arc torch as set forth in claim 4 wherein an axial tube extends through the electrode holder and engages in gas-tight relationship axial passages provided through the electrode mounting means and the electrode insert, and means for providing shielding gas to said tube at the opposite end thereof from the electrode whereby a stream of gas may be passed through the center of the arc.

6. A non-consumable transferred arc torch device for heating a metal melting furnace with a directionally stabilized quasi-electrode which comprises an inner electrode holder having a coolant passage therein and an outer member having coolant passages therein radially spaced from said electrode holder and forming an annular shielding gas passageway therebetween, a refractory metal electrode insert at one end of the electrode holder in electrical and thermal contact therewith, said inner electrode holder and the electrode insert having an axial passage therethrough for supplying shielding gas to substantially reduce electrode erosion, a nozzle member at the adjacent end of the outer member said nozzle having a relatively wide inlet portion surrounding the metal electrode insert and the lower end of the electrode holder and a constricted outlet portion forming an annular orifice of smaller diameter than said annular passageway, said refractory metal electrode extending into but not beyond said constricted outlet portion, means at the other ends of the device for supplying arc power to the electrode holder and shielding gas to the annular passageway, and electrically insulative spacers located between the inner electrode holder and the outer member in the annular shielding gas passage.

References Cited in the file of this patent

UNITED STATES PATENTS

| | | |
|---|---|---|
| 2,471,531 | McIntyre et al. | May 31, 1949 |
| 2,554,236 | Bernard | May 22, 1951 |
| 2,768,279 | Rava | Oct. 23, 1956 |
| 2,806,124 | Gage | Sept. 10, 1957 |
| 2,938,106 | Hawthorne | May 24, 1960 |
| 2,990,466 | Cresswell | June 27, 1961 |

FOREIGN PATENTS

| | | |
|---|---|---|
| 769,879 | Great Britain | Mar. 13, 1957 |